United States Patent
Wu et al.

(10) Patent No.: US 8,285,465 B2
(45) Date of Patent: Oct. 9, 2012

(54) COOPERATIVE TRACTION CONTROL SYSTEM USING DUAL SLIP CONTROLLERS

(75) Inventors: Hsien-cheng (Kevin) Wu, Novi, MI (US); Qingyuan Li, Ann Arbor, MI (US); Jin-jae Chen, Canton, MI (US)

(73) Assignee: Robert Bosch GmbH, Stuttgart (DE)

(*) Notice: Subject to any disclaimer, the term of this patent is extended or adjusted under 35 U.S.C. 154(b) by 478 days.

(21) Appl. No.: 12/556,441

(22) Filed: Sep. 9, 2009

(65) Prior Publication Data
US 2010/0332094 A1   Dec. 30, 2010

Related U.S. Application Data

(60) Provisional application No. 61/221,707, filed on Jun. 30, 2009.

(51) Int. Cl.
*B60T 8/00* (2006.01)
(52) U.S. Cl. .................................. 701/69; 180/244
(58) Field of Classification Search ............ 701/69, 701/1, 36, 48, 89, 90; 180/244, 197, 233, 180/245, 246
See application file for complete search history.

(56) References Cited

U.S. PATENT DOCUMENTS

| | | | |
|---|---|---|---|
| 5,247,443 A | 9/1993 | Gilliam | |
| 5,738,604 A | 4/1998 | Dick | |
| 6,059,065 A | 5/2000 | Takeda et al. | |
| 6,449,549 B1 | 9/2002 | Dick | |
| 6,598,945 B2* | 7/2003 | Shimada et al. | 303/152 |
| 6,877,578 B2* | 4/2005 | Krzesicki et al. | 180/243 |
| 7,143,855 B2 | 12/2006 | Hopper | |
| 2004/0064239 A1 | 4/2004 | Nagura et al. | |
| 2006/0169516 A1 | 8/2006 | Masuya et al. | |
| 2006/0278460 A1 | 12/2006 | Matsuno et al. | |
| 2008/0183353 A1* | 7/2008 | Post et al. | 701/42 |

FOREIGN PATENT DOCUMENTS
EP           1508466 A1   2/2005
* cited by examiner

*Primary Examiner* — Dalena Tran
(74) *Attorney, Agent, or Firm* — Michael Best & Friedrich LLP

(57) ABSTRACT

A cooperative traction control system that integrates throttle control and torque distribution. The system also uses dual slip controllers and methods that involve controlling the distribution of torque between wheels in the front and rear axles of a vehicle and a relatively small or no adjustment of the engine throttle (or, more generally, engine torque output) to reduce wheel slip. The control is cooperative in the sense that two controllers—a front axle torque controller and a rear axle torque controller—work together (or are controlled together) to reduce wheel slip and thereby achieve improved straight-line movement of a vehicle from a standstill.

21 Claims, 4 Drawing Sheets

Normal Throttle/Brake TCS

Only Throttle Control Used To Reduce Wheel Slip

COOPERATIVE TRACTION CONTROL SYSTEM USING DUAL SLIP CONTROLLERS

RELATED APPLICATIONS

The present application claims priority to U.S. Provisional Patent Application Ser. No. 61/221,707 of the same title, filed on Jun. 30, 2009, the entire contents of which is herein incorporated by reference.

BACKGROUND

Modern four-wheel or all-wheel drive vehicles have been developed to provide greater vehicle traction over varied terrain and road surfaces. Roads may be dry, wet, icy, snow-covered, or some combination of these conditions and four-wheel or all-wheel drive vehicles offer advantages over vehicles in which just two wheels are driven (for example, either the front wheels or the rear wheels). Often, all-wheel drive vehicles use an electronically controlled system to affect the way in which the vehicle responds to certain road conditions. For example, electronic sensing units are used to monitor vehicle conditions such as wheel speed. Such sensing units provide signals to a control unit, which can alter how torque is distributed to the wheels. For example, in many current traction control systems, if wheel slip is detected, throttle control is implemented such that the torque output of the engine is reduced and, as a consequence, the torque to the driven wheels is reduced.

SUMMARY

Although traction control systems are known, they are not fully satisfactory. For example, many systems do not manipulate torque to drive wheels on the front and rear axles. In addition, many do not integrate throttle control and torque distribution.

One embodiment of the invention provides what the inventors refer to as "cooperative" traction control, which involves control of the distribution of torque between wheels in the front and rear axles of a vehicle and a relatively small or no adjustment of the engine throttle (or, more generally, engine torque output) to reduce wheel slip. The control is cooperative in the sense that two controllers—a front axle torque controller and a rear axle torque controller—work together (or are controlled together) to reduce wheel slip and thereby achieve improved straight-line movement of a vehicle from a standstill.

One embodiment of the invention provides a traction control module that includes first and second comparators. The first comparator receives a left front wheel slip value and a right front wheel slip value. The second comparator receives a left rear wheel slip value and a right rear wheel slip value. Each comparator outputs the larger of the two wheel slip values received. Each of these values is a "front axle slip value" and a "rear axle slip value," respectively. The traction control module also includes first and second summing nodes, one to process the front axle slip value from the first comparator and one to process the rear axle slip value from the second comparator. The output of each comparator is provided to a summing node. The summing node for the front axle also receives a target slip value for the front axle. The summing node for the rear axle receives a target slip value for the rear axle. The outputs of the summing nodes represent slip errors and these values are provided, respectively, to front and rear axle controllers. The front and rear axle controller generates torque command signals based on the error signals.

The module also includes a third comparator. The output of the front axle controller is inverted and sent to the third comparator. The third comparator determines the lesser of the front axle command signal and actual torque provided to the front axle. The lesser of these values is provided to a third summing node, which also receives the output of the rear axle controller. The difference between these values is provided to a fourth summing node which also receives an engine target torque value from an engine controller. The output of the fourth summing node is provided to the engine to control its overall torque output. The command signal from the rear axle controller is provided to a transfer case (or similar controllable, torque-distribution device). The two command signals have the overall effect of mildly reducing the torque produced by the engine and distributing more torque to the rear axle (than the front axle) in a situation where the wheel slip of the front wheels is greater than the wheel slip of the rear wheels.

In another embodiment, the invention provides a method of providing traction control in a vehicle having a front axle, a rear axle, and an engine that produces torque. The method includes determining a left front wheel slip value and a right front wheel slip value; comparing the left and right front wheel slip values; and generating a front axle slip value that is indicative of the greater of the two. A left rear wheel slip value and a right rear wheel slip value are determined and compared to generate a rear axle slip value that is indicative of the greater of the two. Once wheel slip has been evaluated on an axle-by-axle basis, a first slip error is determined based on the front axle slip value and a target slip value for the front axle. A second slip error based on the rear axle slip value and a target slip value for the rear axle is also determined. A first torque command output is generated by or with a front axle controller based on the first slip error. A second torque command output is generated by or with a rear axle controller based on the second slip error.

The torque commands are used to control the torque of the front and rear axles. However, the first torque command is modified in a manner that accounts for 1) the difference in the target torque for the front wheels and the actual torque and 2) the amount of torque that can be shifted to the rear wheels, in circumstances where the traction available to the rear wheels is greater than the traction available to the front wheels. In one implementation, this adjustment is achieved by comparing the first torque command output and an actual front axle torque value and generating an excess torque output that is indicative of the lesser of the two. A difference output based on the difference between the excess torque amount and the second torque command is determined. An engine target torque value is generated with an engine controller and an engine torque command is determined based on the difference output and the engine target torque value. The engine torque command is provided to an engine controller to control a torque output of the engine. The command signal from the rear axle controller is provided to a controllable torque distribution device (such as a transfer case) to control the amount of torque provided to the rear axle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, embodiments described below relate to vehicles in which the front wheels provide the primary motive force and motive torque is provided to the rear wheels only when certain conditions exist. However, the techniques described could be readily applied to other vehicles, including vehicles that are primarily rear-wheel drive and in which motive torque is provided to the front wheels under certain circumstances. Thus, in a more general sense, embodiments of the invention are applicable to vehicles with "first" and "second" axles or groups of axles and torque may be controlled based on whether wheel slip is greater at one of the two axles or groups of axles.

Figure 1A:
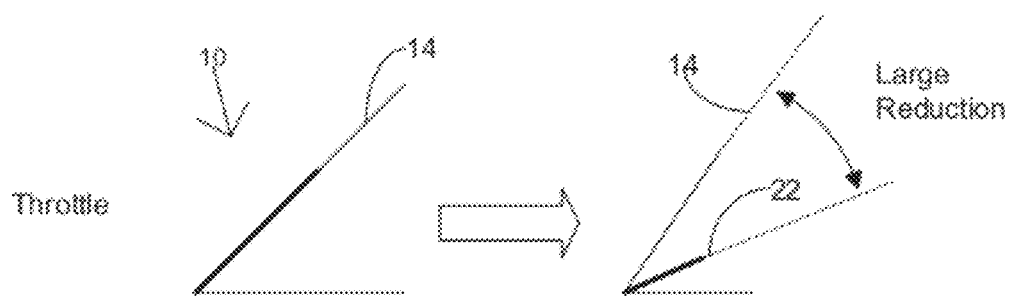
FIG. 1A illustrates throttle control used in prior traction control systems.

FIG. 1A illustrates the operation of a prior vehicle traction control system that relies upon throttle control. Traditionally, throttle control involves mechanically manipulating a throttle that controls the flow of an air-fuel mixture into an internal combustion engine. In many vehicles, an accelerator or "gas pedal" operated by a vehicle driver is connected to the throttle to control the amount of air-fuel mixture into the engine and, as a consequence, the output or torque of the engine. It should also be understood that until relatively recently torque distribution was uniform and non-selective in that drive trains were, at least in general, designed to provide an equal amount of torque to drive wheels and the ability to control the amount of torque was often limited to either applying all available engine torque to the driven wheels or none.

In the context of the current invention, "throttle control" is not strictly limited to control of a throttle, as modern vehicles may include a variety of mechanisms that control the delivery of air and fuel to an engine in addition to or in place of a throttle. Also, modern vehicles may include electric or other motors whose output is not controlled by a throttle controlling an air-fuel mixture, but, for example, the amount of current provided to the motor. Accordingly, throttle control is used more broadly to indicate controlling the output of a vehicle engine. A vehicle engine may be an internal combustion engine, an electric motor, a hybrid drive train, a hydraulic motor, or other source of torque.

Figure 1B:
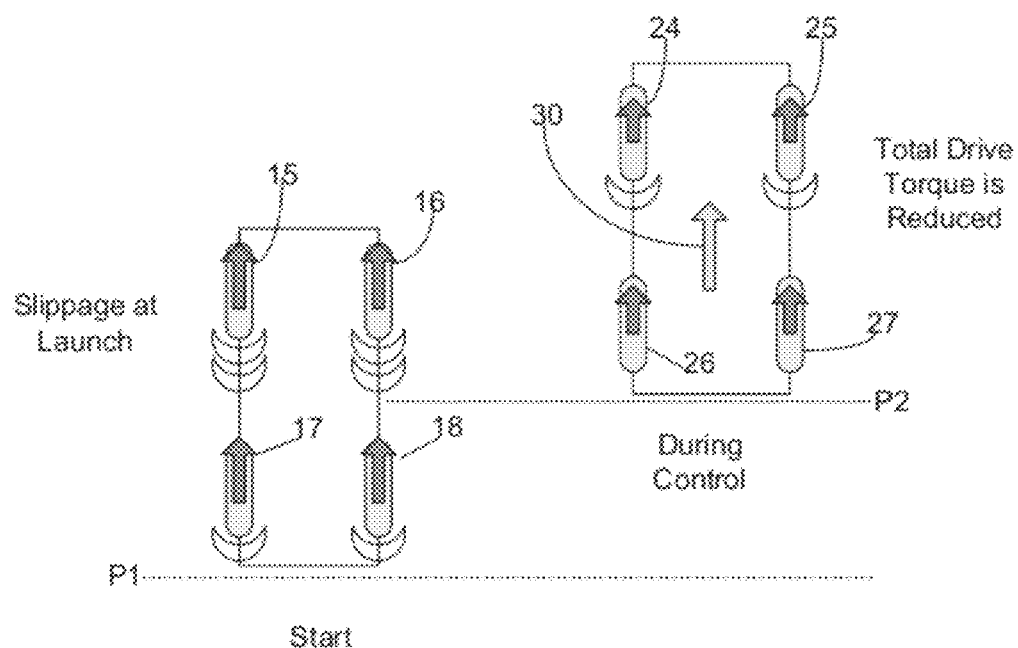
FIG. 1B illustrates drive torque distribution used in prior traction control systems.

The left-hand side of FIG. 1A includes a graphic representation 10 of throttle control where a certain throttle input 14 is provided to the vehicle engine to cause a vehicle to move from a standstill. As shown in FIG. 1B, in a vehicle with four-wheel or all-wheel drive an amount of torque (represented by upwardly pointing arrows 15-18) is provided to each of the vehicle wheels. In FIG. 1B, a situation in which the front wheels experience more slip or slippage as compared to the rear wheels is shown (as indicated by the two graphical indicators (crescents in the drawings) behind each front wheel and one graphical indicator (again, a crescent) behind each rear wheel). Such a situation might arise, for example, when the front wheels of a vehicle are on an icy spot and the rear wheels are located on ice-free pavement. In the system shown in FIGS. 1A and 1B, once wheel slip is detected the throttle input from the driver is overridden by the traction control system ("TCS"). To reduce the slip of the front wheels, the TCS reduces the amount of torque provided to the wheels, by reducing the throttle input from the input 14 to a throttle input 22. But as is illustrated in FIGS. 1A and 1B, the torque is reduced is a non-selective and drastic manner. To reduce the slippage of the front wheels, the system employs a relatively large reduction in throttle input from the input 14 to the input 22. This results in a reduction of the total drive torque (as shown by the arrows 24-27, which are shorter than the arrows 15-18) and a first acceleration of the vehicle, A1 (represented by arrow 30), and movement of the vehicle from position P1 to P2.

Figure 2A:
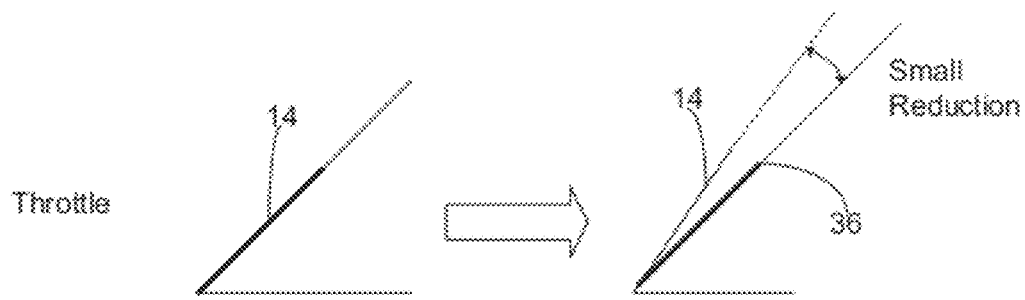
FIG. 2A illustrates throttle control in one embodiment of cooperative traction control.
Figure 2B:
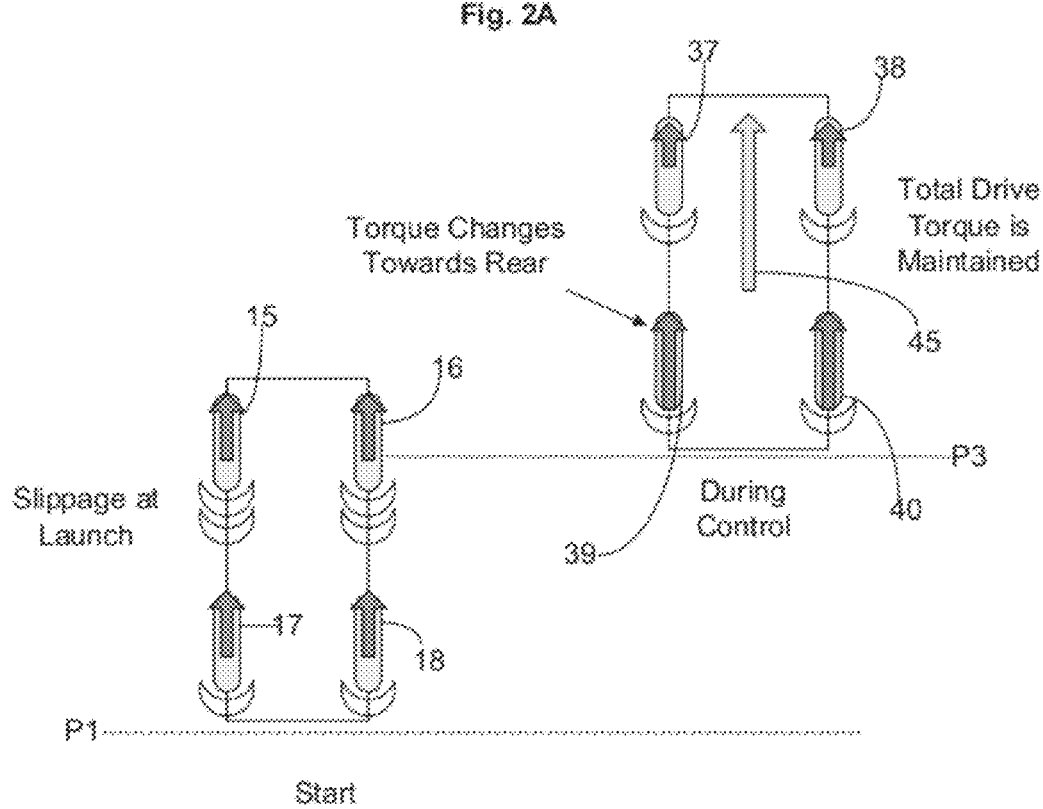
FIG. 2B illustrates drive torque distribution in one embodiment of cooperative traction control.

FIGS. 2A and 2B illustrate vehicle traction control in which the reduction of the throttle input is less than that used in the example illustrated in FIGS. 1A and 1B. In the example illustrated in FIGS. 2A and 2B, throttle input is reduced from the input 14 to an input 36, which is greater than the input 22. In addition to this smaller reduction in throttle input, torque is shifted from the front wheels to the rear wheels as is shown by arrows 37-40. Arrows 39 and 40 are longer than arrows 37 and 38, indicating that a greater amount of torque has been applied to the rear wheels. This results in increased acceleration of the vehicle, A2 (represented by the arrow 45), and movement of the vehicle from position P1 to position P3. P3 is farther away from P1 than position P2. Thus, improved vehicle launch (from a standstill) is achieved with the system illustrated in FIGS. 2A and 2B.

Figure 3:
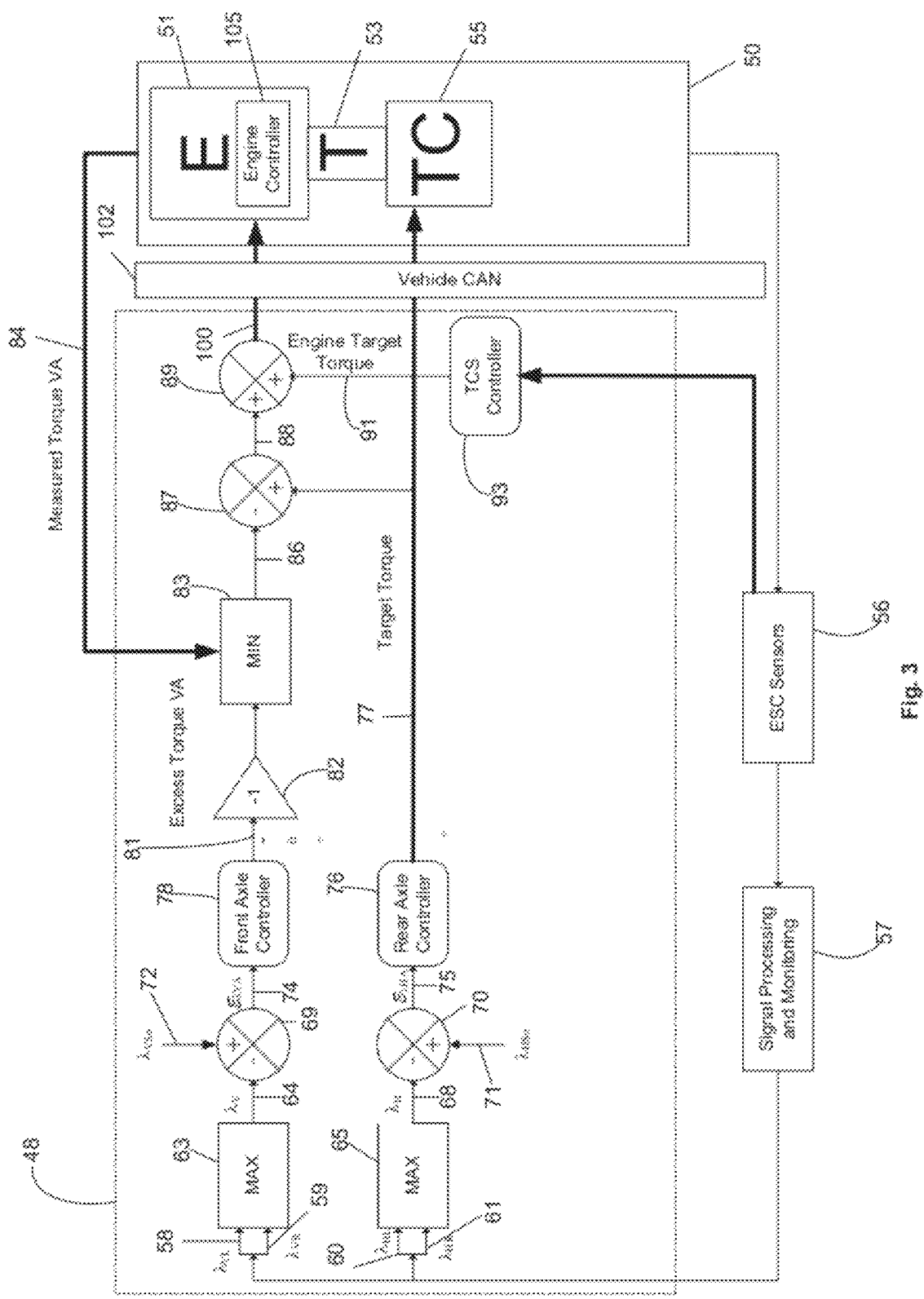
FIG. 3 illustrates an embodiment of a cooperative traction control module designed for an all-wheel drive vehicle that is primarily front-wheel drive.

FIG. 3 illustrates a cooperative traction control module 48 and the flow of information between the module 48 and other control modules in a vehicle 50. The vehicle includes an engine 51, a transmission 53, and transfer case 55 (all shown schematically). As noted above, the engine may be an internal combustion engine, electric motor, or other source of torque. Also, multiple engines could be used. For example, an electric motor could be used at each wheel of the vehicle. The transfer case 55 is, in general terms, a controllable, torque-distribution device in the sense that it, in response to a command or signal, distributes torque from a source (such as an internal combustion engine) to axles connected to the wheels of the vehicle. In an embodiment with multiple engines or motors, the need for a torque distribution device is lessened as the distribution of torque may be accomplished through, for example, individually controlling each engine.

In the embodiment shown, the module 48 is illustrated as if it and some other components in the drawings are separate from and outside of the vehicle 50 (shown schematically). However, in most implementations, the module 48, the vehicle controller area network ("CAN") bus (discussed below), and other components are all located within the vehicle 50. Sensors 56 that are part of an electronic stability control ("ESC") system (and thus, actually located within the vehicle 50) collect information about the vehicle such as the rotational speed of each of the wheels of the vehicle. The wheel speed information from the ESC system sensors 56 can be processed using known techniques (as is shown by processing block 57) to generate four wheel slip values: 58, 59, 60, and 61. The value 58 is the wheel slip for the left front wheel. Value 59 is the wheel slip for the right front wheel. Values 60 and 61 correspond to the wheel slip for the left rear wheel and right rear wheel, respectively.

The two front wheel slip values 58 and 59 are fed to a first comparator 63. The comparator 63 determines the larger of the two slip values 58 and 59 and outputs a front axle slip value 64, which represents the largest amount of slip experienced by the front wheels. In a similar manner, the two rear wheel slip values 60 and 61 are fed to a second comparator 65. The comparator 65 determines the larger of the two slip values 60 and 61 and outputs a rear axle slip value 68, which represents the largest amount of slip experienced by the rear wheels.

The output 64 is sent to summing node 69. The summing node 69 receives another input 72 that represents a predetermined or target value for allowable slip at the front axle. The target slip at the front axle 72 is an empirical value (i.e., a value determined based on observation or experimentation).

The summing node 69 determines the difference of the two inputs 64 and 72 and outputs a value 74 indicating the amount of front axle slip error.

The rear axle slip value 68 is sent to summing node 70. Summing node 70 receives a second input 71 that represents a predetermined or target value for allowable slip at the rear axle (which like the input 72 is an empirical value). The summing node 70 determines the difference between the two inputs 68 and 71 and outputs a value 75 indicating the amount of rear axle slip error. The rear axle slip error 75 is sent to a rear axle controller 76. The rear axle controller 76 generates a command signal 77 that includes a target torque value for the rear axle. (In FIG. 3, the label MSoH_CTCS is used to identify the signal 77).

The front axle slip error 74 is provided to a front axle controller 78. The front axle controller 78 uses the front axle slip error 74 to determine an amount of torque to apply to the wheels connected to the front axle. Note that a large (in relative terms) value for the front axle slip error 74 is indicative of a relatively large amount of wheel slip difference. In response to a front axle slip error having such a value, the front axle controller generates a command or output 81 to reduce the amount of torque provided to the front wheels.

When there is slippage, the command signal or output 81 of the front axle controller 78 is indicative of an excess amount of torque on the front axle. (In FIG. 3, the label "Excess Torque VA" is used to identify the output 81). The output 81 is inverted in an inverter 82 and the inverted value is delivered to a third comparator 83. The third comparator 83 also receives an input 84 that represents the actual or measured front axle torque of the vehicle 50. (In FIG. 3, the label "Measured Torque VA" is used to identify the input 84). The comparator 83 generates an output 86, which is the lesser of the input 84 and the inverted output 81.

The output 86 is provided to a summing node 87. The summing node 87 also receives the output or command signal 77 of the rear axle controller 76. The summing node 87 determines the difference between the command signal 77 (target torque) and the output 86 of the comparator 83. The summing node 87 generates an output 88 which is the difference between the excessive torque at the front axle and the additional amount of torque that can be applied to the rear axle (without slippage at the rear axle).

The output 88 is sent to a fourth summing node 89. The summing node 89 receives an engine target torque value 91 which is a signal generated by a TCS controller 93. The TCS controller 93 generates the engine target torque value based on upon information from the ESC sensors 56. The summing node 89 generates an output 100 that is delivered to CAN bus 102 and addressed to an engine controller 105. The command signal 77 is also routed to the CAN bus 102 and addressed to the transfer case 55. The control achieved in reaction to the two command signals 77 and 100 results in torque distribution as illustrated in FIG. 2B when the wheel slip of the front wheels is greater than wheel slip of the rear wheels. In addition, the control technique results in better integration of the control provided by the front and rear axle controllers 78 and 76, in what can be termed a "cooperative" approach.

Figure 4:
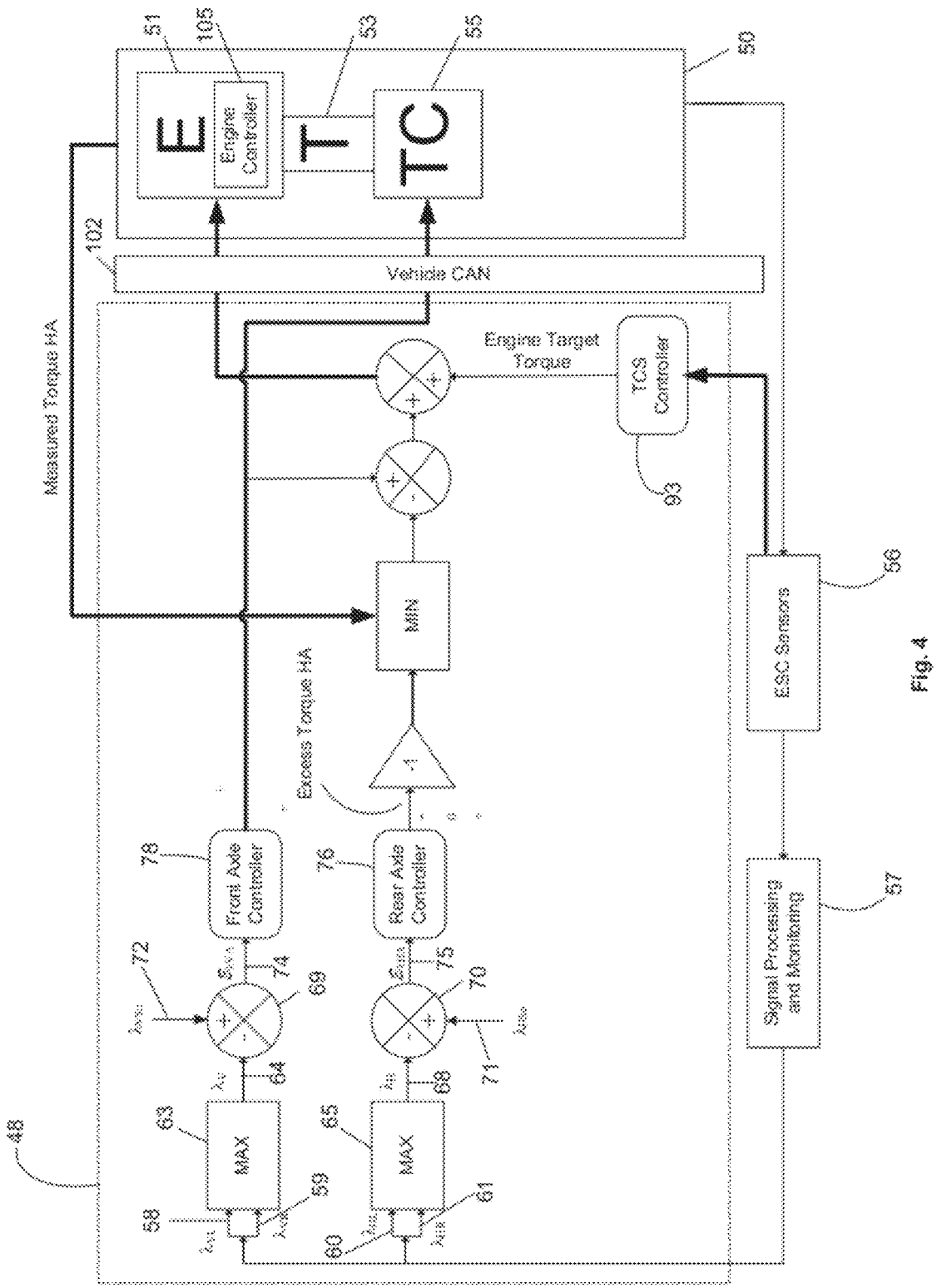
FIG. 4 illustrates an embodiment of a cooperative traction control module designed for an all-wheel drive vehicle that is primarily wheel-rear drive.

FIG. 4 illustrates an embodiment of cooperative traction control implemented in a traction control module designed for use in a vehicle that is primarily rear-wheel drive. As can be seen, in this embodiment torque is transferred from the rear wheels to the front wheels in a manner that is similar to the situation described above with respect to FIGS. 2A, 2B, and 3. Since there are similarities between the primarily front-wheel and primarily rear-wheel drive modalities, no further discussion of FIG. 4 is provided.

Thus, the invention provides, among other things, a traction control module in which the transfer of torque from, for example, the front wheels to rear wheels, is controlled by two controllers each of which performs control on an axle-by-axle basis (i.e., control to both wheels connected to a front axle and control to both wheels connected to a rear axle). Various features and advantages of the invention are set forth in the following claims.

What is claimed is:

1. A traction control module for a vehicle having a first axle, a second axle, and an engine that produces torque, the traction control module comprising:
   a first comparator that receives a first-axle, left wheel slip value and a first-axle, right wheel slip value, the first comparator generating a first axle slip value indicative of a greater of the first-axle, left wheel slip value and the first-axle, right wheel slip value;
   a second comparator that receives a second-axle, left wheel slip value and a second-axle, right wheel slip value, the second comparator generating a second axle slip value indicative of a greater of the second-axle, left wheel slip value and the second-axle, right wheel slip value;
   a first summing node that receives the first axle slip value and a first axle target slip value and that generates a first slip error;
   a second summing node that receives the second axle slip value and a second axle target slip value and that generates a second slip error;
   a first axle controller that generates a first axle torque command output based on the first slip error; and
   a second axle controller that generates a second axle torque command output based on the second slip error.

2. The traction control module of claim 1, further comprising a third comparator that receives the first axle torque command output and an actual first axle torque value and generates an output indicative of the lesser of the first axle torque command output and the actual first axle torque value.

3. The traction control module of claim 2, further comprising
   a third summing node that receives the output of the third comparator and the second axle torque command output and generates a difference output.

4. The traction control module of claim 3, further comprising:
   an engine controller that produces an engine target torque value; and
   a fourth summing node that receives the difference output and the engine target torque value and generates an engine torque command.

5. The traction control module of claim 4, further comprising a controllable torque distribution device, and wherein the engine torque command is provided to the engine controller to control an engine torque output and the second axle torque command is provided to the controllable torque distribution device.

6. The traction control module of claim 5, wherein an effect of the engine torque command and the second axle torque command is to reduce an overall torque produced by the engine and distribute more torque to the second axle than to the first axle in a situation where the first axle slip value is greater than the second axle slip value.

7. A method of providing fraction control in a vehicle having a first axle, a second axle, and an engine that produces torque, the method comprising
   determining, with a traction control module, a left first-axle wheel slip value, a right first axle wheel slip value, a left second-axle wheel slip value, and a right second-axle wheel slip value;
   determining, with a first comparator, a first axle slip value by comparing the left first-axle wheel slip value and the right first-axle wheel slip value;
   determining, with a second comparator, a second axle slip value by comparing the left second-axle wheel slip value and the right second-axle wheel slip value;

determining, with a first summing node, a first slip error based on the first axle slip value and a first axle target slip value;

determining, with a second summing node, a second slip error based on the second axle slip value and a second axle target slip value;

generating, with a first axle controller, a first axle torque command output based on the first slip error; and generating, with a first axle controller, a second axle torque command output based on the second slip error.

8. The method of claim 7, further comprising:

comparing, with a third comparator, the first axle torque command output and an actual first axle torque value and generating, with the third comparator, an excess torque output that is indicative of a lesser of the first axle torque command output and the actual first axle torque value;

determining, with a third summing node, a difference output based on a difference between the excess torque output and the second axle torque command.

9. The method of claim 8, further comprising:

generating an engine target torque value with an engine controller; and determining, with a fourth summing node, an engine torque command based on the difference output and the engine target torque value.

10. The method of claim 9, further comprising:

providing the engine torque command to an engine controller to control a torque output of the engine; and providing the second axle torque command output from the second axle controller to a controllable torque distribution device in the vehicle.

11. A traction control module for a vehicle having a front axle, a rear axle, and an engine that produces torque, the traction control module comprising:

a first comparator that receives a left front wheel slip value and a right front wheel slip value, the first comparator generating a front axle slip value indicative of a greater of the left front wheel slip value and the right front wheel slip value;

a second comparator that receives a left rear wheel slip value and a right rear wheel slip value, the second comparator generating a rear axle slip value indicative of a greater of the left rear wheel slip value and the right rear wheel slip value;

a first summing node that receives the front axle slip value and a front axle target slip value and that generates a first slip error;

a second summing node that receives the rear axle slip value and a rear axle target slip value and that generates a second slip error;

a front axle controller that generates a first axle torque command output based on the first slip error; and a rear axle controller that generates a second axle torque command output based on the second slip error.

12. The traction control module of claim 11, further comprising a third comparator that receives the first axle torque command output and an actual front axle torque value and generates an output indicative of a lesser of the torque first axle torque command output and the actual front axle torque value.

13. The traction control module of claim 12, further comprising a a third summing node that receives the output of the third comparator and the second axle torque command output and generates a difference output.

14. The traction control module of claim 13, further comprising:

an engine controller that produces an engine target torque value; and a fourth summing node that receives the difference output and the engine target torque value and generates an engine torque command.

15. The traction control module of claim 14, further comprising a controllable torque distribution device, and wherein the engine torque command is provided to the engine controller to control a torque output of the engine and the second axle torque command output is provided to the controllable torque distribution device.

16. The traction control module of claim 15, wherein the effect of the engine torque command and the second axle torque command output is to reduce an overall torque produced by the engine and distribute more torque to the rear axle than to the front axle in a situation where the front axle slip value is greater than the rear axle slip value.

17. A method of providing fraction control in a vehicle having a front axle, a rear axle, and an engine that produces torque, the method comprising:

determining, with a fraction control module, a left front wheel slip value and a right front wheel slip value;

comparing, with a first comparator, the left front wheel slip value and the right front wheel slip value and generating a front axle slip value that is indicative of a greater of the left front wheel slip value and the right front wheel slip value;

determining, with the traction control module, a left rear wheel slip value and a right rear wheel slip value;

comparing, with a second comparator, the left rear wheel slip value and the right rear wheel slip value and generating a rear axle slip value that is indicative of the greater of the left rear wheel slip value and the right rear wheel slip value;

determining, with a first summing node, a first slip error based on the front axle slip value and a target slip value for the front axle;

determining, with a second summing node, a second slip error based on the rear axle slip value and a target slip value for the rear axle;

generating, with a front axle controller, a first torque command output based on the first slip error; and generating, with a rear axle controller, a second torque command output based on the second slip error.

18. The method of claim 17, further comprising:

comparing, with a third comparator, the first torque command output and an actual front axle torque value and generating, with the third comparator, an excess torque output that is indicative of the lesser of the first torque command output and the actual front axle torque value.

19. The method of claim 18, further comprising:

determining, with a third summing node, a difference output based on the difference between the excess torque output and the second torque command output.

20. The method of claim 19, further comprising:

generating an engine target torque value with an engine controller; and determining, with a fourth summing node, an engine torque command based on the difference output and the engine target torque value.

21. The method of claim 20, further comprising:

providing the engine torque command to the engine controller to control a torque output of the engine; and providing the second torque command output to a controllable torque distribution device in the vehicle.

* * * * *